United States Patent
Kao (10) Patent No.: US 11,675,258 B2
(45) Date of Patent: Jun. 13, 2023

(54) WAVELENGTH CONVERSION ELEMENT AND PROJECTION DEVICE

(71) Applicant: Coretronic Corporation, Hsin-Chu (TW)

(72) Inventor: Wei-Hua Kao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/408,486

(22) Filed: Aug. 23, 2021

(65) Prior Publication Data

US 2022/0066302 A1 Mar. 3, 2022

(30) Foreign Application Priority Data

Aug. 27, 2020 (CN) .......................... 202010875063.7

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC .. G03B 21/204; G02B 26/008; B23K 9/0035; B23K 9/0203; B23K 9/0043; B23K 11/0026
See application file for complete search history.

(56) References Cited

U.S. PATENT DOCUMENTS

| | | | | |
|---|---|---|---|---|
| 3,132,236 | A | * 5/1964 | Deininger | B23K 35/224 219/92 |
| 4,359,599 | A | * 11/1982 | Benner | H01R 4/029 219/127 |
| 8,357,871 | B2 | * 1/2013 | Ananthanarayanan | B23K 9/24 219/136 |
| 2019/0121119 | A1 | * 4/2019 | Chen | H04N 9/3161 |

FOREIGN PATENT DOCUMENTS

| | | | |
|---|---|---|---|
| CN | 207922119 U | * 9/2018 | |
| TW | M483456 U | 8/2014 | |
| WO | WO-2007108079 A1 | * 9/2007 | ........... B23K 35/286 |

* cited by examiner

*Primary Examiner* — Evan P Dzierzynski
*Assistant Examiner* — Nathaniel J Lee (57) ABSTRACT

A wavelength conversion element includes a substrate, a counterweight member and a wavelength conversion layer. The substrate has a first surface and a second surface opposite to each other. The counterweight member is welded to the first surface of the substrate and protrudes from the first surface of the substrate. The wavelength conversion layer is disposed on the first surface or the second surface of the substrate. A projection device having the wavelength conversion element is also provided. The wavelength conversion element and the projection device provided by the invention have good reliability.

10 Claims, 5 Drawing Sheets

WAVELENGTH CONVERSION ELEMENT AND PROJECTION DEVICE

CROSS-REFERENCE TO RELATED APPLICATION

This application claims the priority benefit of China application CN202010875063.7, filed on Aug. 27, 2020. The entirety of the above-mentioned patent application is hereby incorporated by reference herein and made a part of this specification.

FIELD OF THE INVENTION

The invention relates to a wavelength conversion element, and more particularly to a wavelength conversion element used for a projection device, and a projection device having the wavelength conversion element.

BACKGROUND OF THE INVENTION

The rotation speed of the phosphor wheel of the laser projector in prior art is about 7200 rpm or higher. Under such high-speed operation, a slight imbalance may cause a large vibration, and the quality of dynamic balance has a significant impact on the service life of a motor.

The dynamic balance can be improved by weighting method. Specifically, the phosphor wheel may be provided with a counterweight block, and the counterweight block can be fixed on the phosphor wheel by adhesive material (e.g., light curing adhesive). However, since the poor temperature resistance of the adhesive material, the adhesive material is likely to overheat and deteriorate and lose its viscosity as the power specifications of the projector increase, causing the counterweight block cannot be firmly attached to the phosphor wheel. In addition, part of the adhesive material will vaporize into gas and adhere to other components when the adhesive material is in a high temperature environment for a long time, and therefore not only other components may be contaminated, but the quality of the adhesive material may gradually decrease due to gasification, and eventually leading to imbalance in dynamic balance. In addition, the counterweight block is usually disposed close to the center of the phosphor wheel and away from the high temperature area on the outer edge of the phosphor wheel, resulting in a small rotation radius of the counterweight block, so the unit weight of the counterweight block has low balance benefits. In other words, a heavier counterweight block is required to achieve dynamic balance, and the amount of adhesive material used to fix the counterweight block also increases, and the weight load on the motor also increases.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element with better reliability.

The invention provides a projection device with better reliability.

Other objectives and advantages of the invention can be further illustrated by the technical features broadly embodied and described as follows.

In order to achieve one or a part or all of the above or other objectives, an embodiment of the invention provides a wavelength conversion element, which includes a substrate, a counterweight member and a wavelength conversion layer. The substrate has a first surface and a second surface opposite to each other. The counterweight member is welded to the first surface of the substrate and protrudes from the first surface of the substrate. The wavelength conversion layer is disposed on the first surface or the second surface of the substrate.

In order to achieve one or a part or all of the above or other objectives, an embodiment of the invention provides a projection device, which includes an illumination system, a light valve and a projection lens. The illumination system is adapted to provide an illumination beam. The light valve is disposed on a transmission path of the illumination beam to convert the illumination beam into an image beam. The projection lens is disposed on a transmission path of the image beam. The illumination system includes an excitation light source and the aforementioned wavelength conversion element. The excitation light source is adapted to provide an excitation beam. The wavelength conversion element is disposed on a transmission path of the excitation beam.

In summary, because the invention adopts the wavelength conversion element in which the counterweight member is welded to the substrate, it is not necessary to use the adhesive material with poor temperature resistance to fix the counterweight member, so that the wavelength conversion element of the invention has better reliability. On the other hand, the projection device of the invention can also have better reliability due to adopting the above-mentioned wavelength conversion element.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
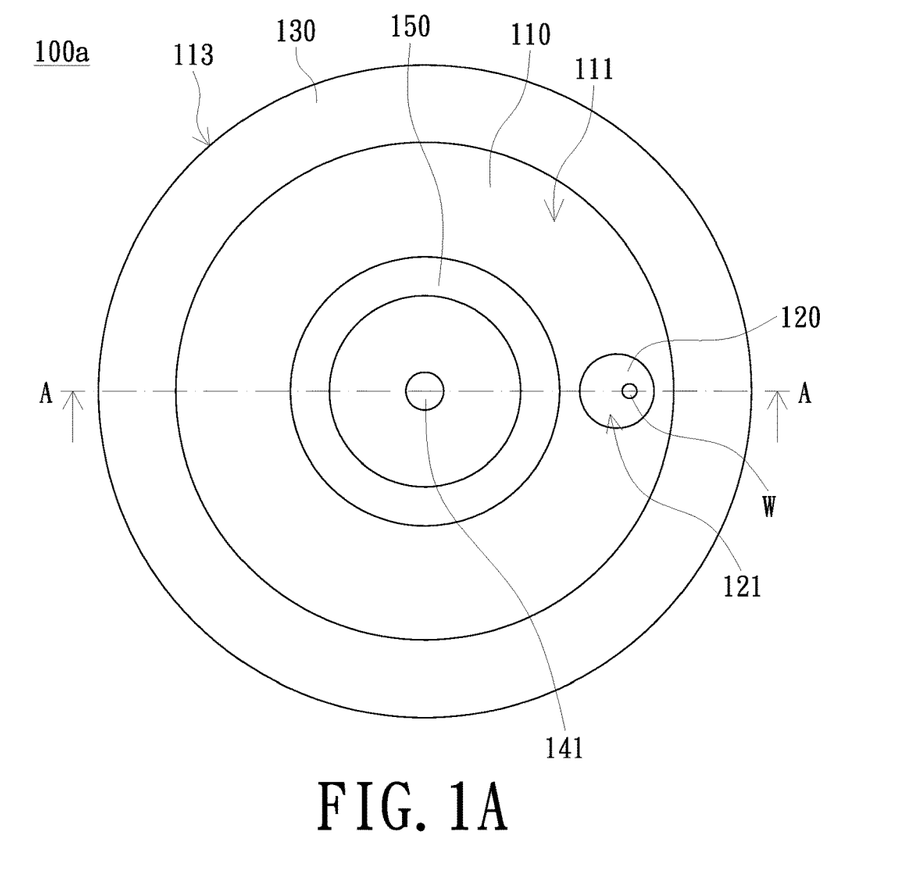
FIG. 1A is a schematic top view of a wavelength conversion element according to an embodiment of the invention.
Figure 1B:
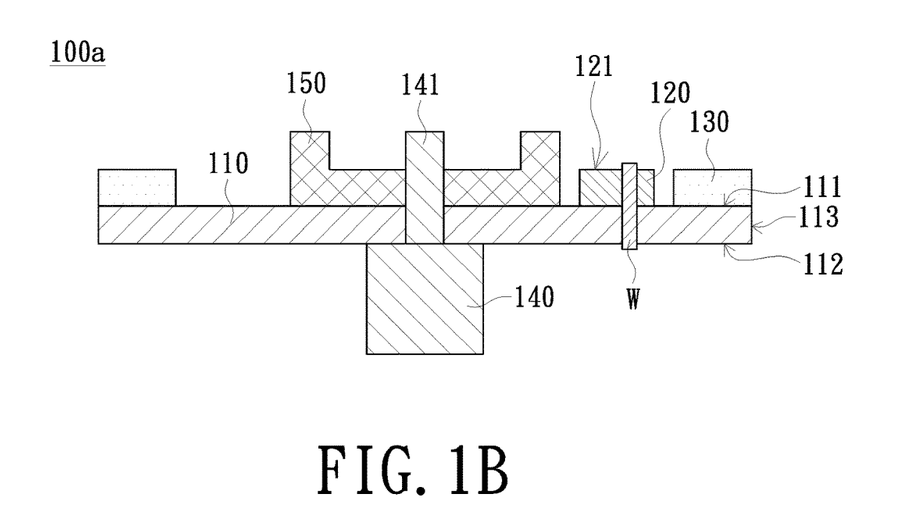
FIG. 1B is a schematic cross-sectional view of the wavelength conversion element, taken along the line A-A in FIG. 1A.

FIG. 1A is a schematic top view of a wavelength conversion element according to an embodiment of the invention. FIG. 1B is a schematic cross-sectional view of the wavelength conversion element, taken along the line A-A in FIG. 1A. Please refer to FIGS. 1A and 1B. The wavelength conversion element 100a includes a substrate 110, a counterweight member 120 and a wavelength conversion layer 130. The substrate 110 has a first surface 111 and a second surface 112 opposite to each other. The counterweight member 120 is welded to the first surface 111 of the substrate 110 and protrudes from the first surface 111. The wavelength conversion layer 130 is disposed on the first surface 111 or the second surface 112 of the substrate 110. In this embodiment, the wavelength conversion layer 130 is disposed on the first surface 111 of the substrate 110 as an example.

In some embodiments, the wavelength conversion element 100a may further include a motor 140 and a fixing member 150. The substrate 110 is sleeved on the rotating shaft 141 of the motor 140. The fixing member 150 is sleeved on the rotating shaft 141 and pressed against the substrate 110. The wavelength conversion layer 130 surrounds the rotating shaft 141. The counterweight member 120 is disposed between the fixing member 150 and the outer edge 113 of the substrate 110. The counterweight member 120 of this embodiment, for example, does not contact the fixing member 150 or the wavelength conversion layer 130. However, in another embodiment, the counterweight member 120 may contact the fixing member 150, and the counterweight member 120 may be welded to the fixing member 150 and the substrate 110. In addition, the counterweight member 120 may also contact the wavelength conversion layer 130. The embodiment does not limit the position of the counterweight member 120 on the substrate 110.

In some embodiments, the material of the substrate 110 may include metal (e.g., aluminum, copper, silver) or other materials with high temperature resistance and high thermal conductivity (e.g., ceramic), but the invention is not limited thereto. In this embodiment, the shape of the substrate 110 may be a ring, but is not limited thereto.

In some embodiments, the wavelength conversion layer 130 is used to convert an excitation beam into a converted beam. The wavelength conversion layer 130 may include at least one wavelength conversion material. For example, the wavelength conversion layer 130 may include a wavelength conversion material for emitting yellow or green beams, but is not limited thereto. In addition, the wavelength conversion material is, for example, a fluorescent material, a phosphorescent material (e.g., a phosphor), or a nano material (e.g., a quantum dot), but is not limited thereto.

In some embodiments, the material of the counterweight member 120 may include metal or plastic, where the metal is, for example, copper, but is not limited thereto. In addition, the counterweight member 120 of this embodiment is, for example, directly welded to the substrate 110. In other embodiments, the counterweight member 120 may also be welded to the substrate 110 by other materials, and the material for welding the counterweight member 120 to the substrate 110 and the material of the counterweight member 120 may be the same or different from each other. For example, the material for welding the counterweight member 120 to the substrate 110 may include metal, ceramic, glass, plastic, etc., and the invention is not limited thereto.

In some embodiments, the counterweight member 120 and the substrate 110 are partially melted to form a welding structure W. As shown in FIG. 1B, the welding structure W extends from the connection between the counterweight member 120 and the substrate 110 to at least one of the second surface 112 of the substrate 110 and the surface 121 of the counterweight member 120 away from the substrate 110. The welding structure W may further protrude from the surface 121 of the counterweight member 120 away from the substrate 110 and/or the second surface 112 of the substrate 110. As shown in FIG. 1B, the two opposite ends of the welding structure W protrude from the second surface 112 of the substrate 110 and the surface 121 of the counterweight member 120, respectively. In another embodiment, the end of the welding structure W may only protrude from the second surface 112 of the substrate 110 or the surface 121 of the counterweight member 120. Alternatively, the end of the welding structure W, for example, extends to but does not protrude from the second surface 112 of the substrate 110 or the surface 121 of the counterweight member 120.

In some embodiments, single-point welding, multi-point welding, linear welding or surface welding can be used to match the shape of the counterweight member 120 and ensure that the counterweight member 120 can be firmly welded to the substrate 110, but the invention is not limited thereto. In addition, the welding method may be laser welding, electric arc welding, resistance welding, electron beam welding, brazing, friction welding, ultrasonic welding, etc., but the invention is not limited thereto. In this embodiment, a laser welding method is used to irradiate a part of the counterweight member 120 and the substrate 110 with a laser to cause melting, and the melted part is then cooled to form the welding structure W. Therefore, the welding structure W extends from the connection between the counterweight member 120 and the substrate 110 to at least one of the second surface 112 of the substrate 110 and the surface 121 of the counterweight member 120. For example, the welding structure W will extend at least to the surface 121 of the counterweight member 120 if the laser is irradiated to the counterweight member 120 from the surface 121 of the counterweight member 120, but the welding structure W may also extend to the second surface 112 of the substrate 110.

Compared with the prior art, since the counterweight member 120 of this embodiment is fixed on the substrate 110 by welding instead of using an adhesive material with poor temperature resistance, it can be ensured that the counterweight member 120 can be firmly fixed on the substrate 110, and therefore the reliability of the wavelength conversion element 100a is improved. In addition, the welding method has the advantage of better temperature resistance. That is, the counterweight member 120 can still be disposed close to the outer edge 113 of the substrate 110 even if the temperature of the outer edge 113 of the substrate 110 is higher than the temperature of the center of the substrate 110. In this way, the counterweight member 120 can have a greater radius of rotation, so that the balance benefit of the counterweight member 120 per unit weight can be improved, the total weight of the counterweight member 120 can be reduced to reduce the cost, and the weight load of the motor 140 can be reduced. It should be noted that, the counterweight member 120 may also be welded to the fixing member 150 in other embodiments of the invention, that is, the counterweight member 120 is not limited to being welded to the substrate 110.

Figure 2:
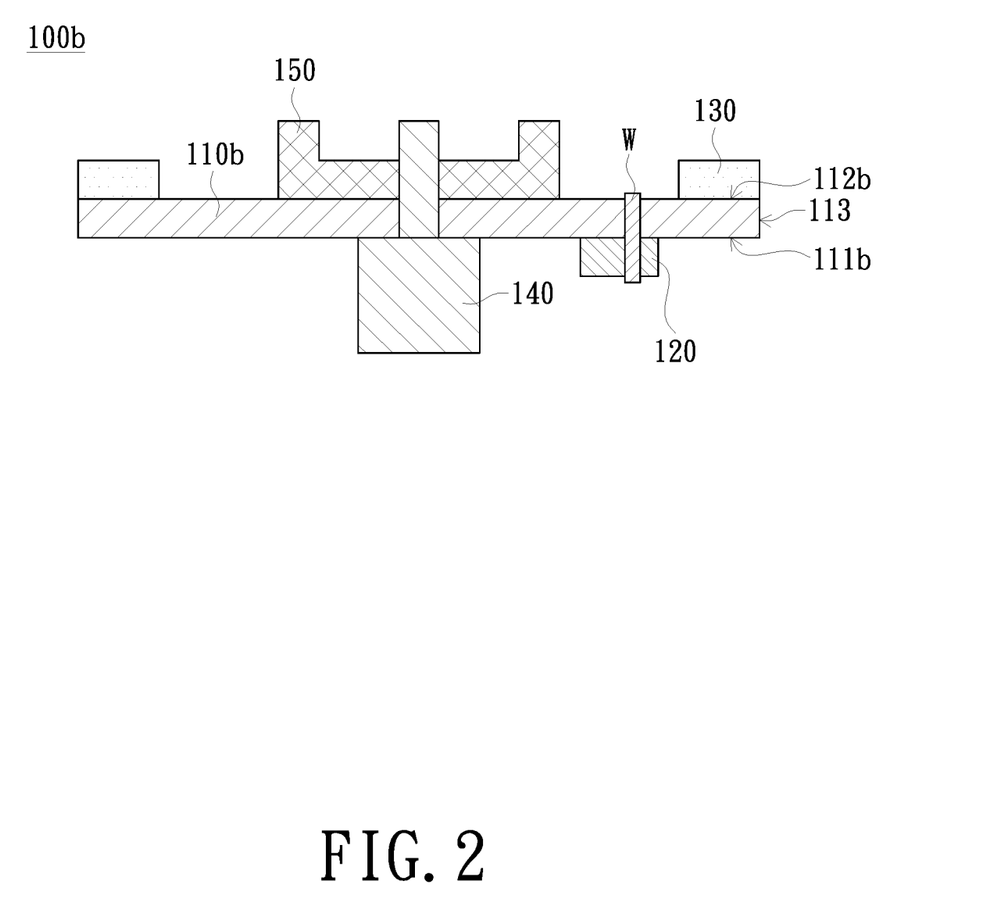
FIG. 2 is a schematic cross-sectional view of a wavelength conversion element according to another embodiment of the invention.

FIG. 2 is a schematic cross-sectional view of a wavelength conversion element according to another embodiment of the invention. The wavelength conversion element 100b of this embodiment and the above-mentioned wavelength conversion element 100a have similar structures and advantages, and only the differences will be described below. Please refer to FIG. 2. The counterweight member 120 and the wavelength conversion layer 130 of this embodiment are located on different sides of the substrate 110b, and the counterweight member 120 is located between the fixing member 150 and the outer edge 113 of the substrate 110b. In the embodiment shown in FIGS. 1A and 1B, the first surface 111 of the substrate 110 faces the light source (not shown), the wavelength conversion layer 130 is located on the first surface 111 of the substrate 110 to receive the excitation beam provided by the light source, and the counterweight member 120 is also disposed on the first surface 111 of the substrate 110. In the embodiment shown in FIG. 2, the second surface 112b of the substrate 110b faces the light source, the wavelength conversion layer 130 is located on the second surface 112b of the substrate 110b, and the counterweight member 120 is located on the first surface 111b of the substrate 110b facing away from the light source.

In some embodiments, since the counterweight member 120 and the wavelength conversion layer 130 are located on different sides of the substrate 110b, the counterweight member 120 may be located under the wavelength conversion layer 130. In other words, the orthographic projection of the wavelength conversion layer 130 on the first surface 111b can overlap the counterweight member 120. The counterweight member 120 of this embodiment can have a greater radius of rotation, which can further improve the balance benefit of the counterweight member 120 per unit weight.

Figure 3:
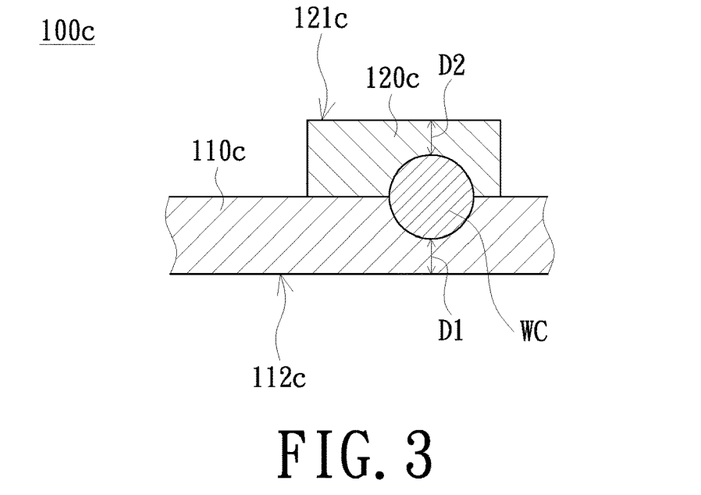
FIG. 3 is a schematic cross-sectional view of a wavelength conversion element according to another embodiment of the invention.

FIG. 3 is a partial schematic cross-sectional view of a wavelength conversion element according to another embodiment of the invention. The wavelength conversion element 100c of this embodiment and the above-mentioned wavelength conversion element 100a have similar structures and advantages, and only the differences will be described below. Please refer to FIG. 3, the counterweight member 120c and the substrate 110c are partially melted to form a welding structure WC. The welding structure WC is located inside the counterweight member 120c and the substrate 110c, and is respectively separated from the surface 121c of the counterweight member 120c and the second surface 112c of the substrate 110c by a certain distance. Specifically, the welding structure WC of this embodiment is formed by, for example, resistance welding. Before the welding structure WC is formed, a voltage may be applied to the second surface 112c of the substrate 110c and the surface 121c of the counterweight member 120c, so that current can flow between the substrate 110c and the counterweight member 120c. Since the junction between the substrate 110c and the counterweight member 120c has a relatively large resistance, the current may generate a high temperature when passing through the junction, which causes melting at the junction. The application of voltage can be stopped after the welding occurs at the junction, so that the molten parts of the substrate 110c and the counterweight member 120c can be cooled and solidified to form the welding structure WC. The difference from the embodiment of FIGS. 1A and 1B is that since this embodiment starts the welding at the junction between the substrate 110c and the counterweight member 120c, the welding structure WC does not extend to the second surface 112c of the substrate 110c and the surface 121c of the counterweight member 120c, but is separated from the second surface 112c of the substrate 110c by a distance D1 and is separated from the surface 121c of the counterweight member 120c by a distance D2.

Figure 4:
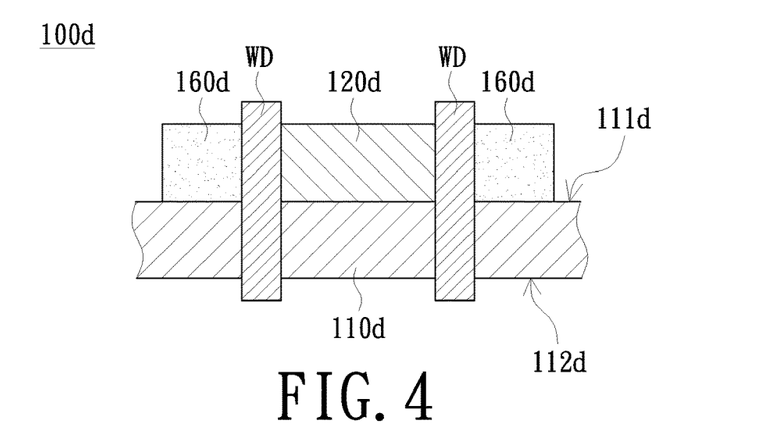
FIG. 4 is a schematic cross-sectional view of a wavelength conversion element according to another embodiment of the invention.

FIG. 4 is a partial schematic cross-sectional view of a wavelength conversion element according to another embodiment of the invention. The wavelength conversion element 100d of this embodiment and the above-mentioned wavelength conversion element 100a have similar structures and advantages, and only the differences will be described below. In order to enhance the firmness of the welding, the wavelength conversion element 100d of this embodiment further includes an auxiliary welding part 160d. The auxiliary welding part 160d is located around the counterweight member 120d and on the first surface 111d of the substrate 110d, and is welded to the substrate 110d and the counterweight member 120d. The auxiliary welding part 160d, the substrate 110d and the counterweight member 120d are partially melted to form at least one welding structure WD.

The welding structure WD is located between the auxiliary welding part 160d and the counterweight member 120d, and can extend to the second surface 112d of the substrate 110d. The auxiliary welding part 160d may be, for example, a material with a melting point that is significantly different from that of the counterweight member 120d and the substrate 110d. For example, the material of the substrate 110d can be aluminum, the material of the counterweight member 120d can be copper, and the material of the auxiliary welding part 160d can be tin, but the invention is not limited thereto. The welding structure WD can be formed by any of the aforementioned welding methods. Taking laser welding as an example, before the welding structure WD is formed, the junction between the auxiliary welding part 160d and the counterweight member 120d is irradiated with a laser to partially melt the auxiliary welding part 160d, the counterweight member 120d and the substrate 110d. The welding structure WD is formed after the melted part is cooled and solidified. In some embodiments, the material of the auxiliary welding part 160d may include phosphor bronze alloy, silver alloy, gold, palladium alloy, aluminum alloy, copper alloy, and nickel alloy.

Figure 5:
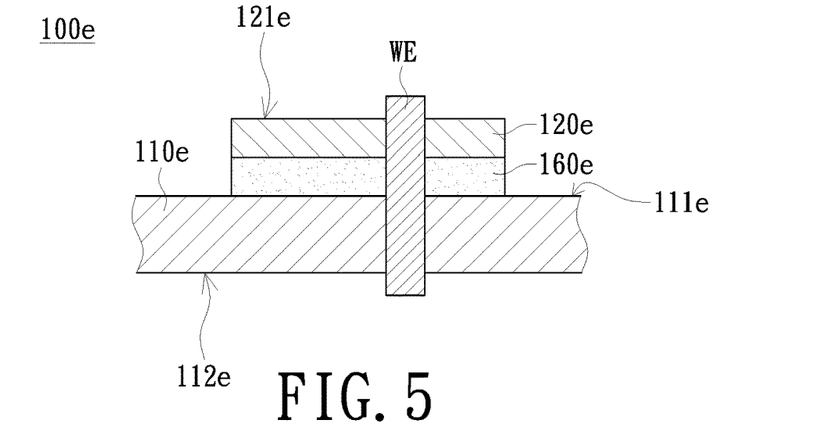
FIG. 5 is a schematic cross-sectional view of a wavelength conversion element according to another embodiment of the invention.

FIG. 5 is a partial schematic cross-sectional view of a wavelength conversion element according to another embodiment of the invention. Please refer to FIG. 5. The auxiliary welding part 160e of this embodiment is, for example, sandwiched between the counterweight member 120e and the first surface 111e of the substrate 110e and is welded to the substrate 110e and the counterweight member 120e. The auxiliary welding part 160e, the substrate 110e and the counterweight member 120e are partially melted to form a welding structure WE. The welding structure WE penetrates the counterweight member 120e, the auxiliary welding part 160e and the substrate 110e. The welding structure WE of this embodiment can be formed by any of the foregoing welding methods, and no redundant detail is to be given herein.

Figure 6:
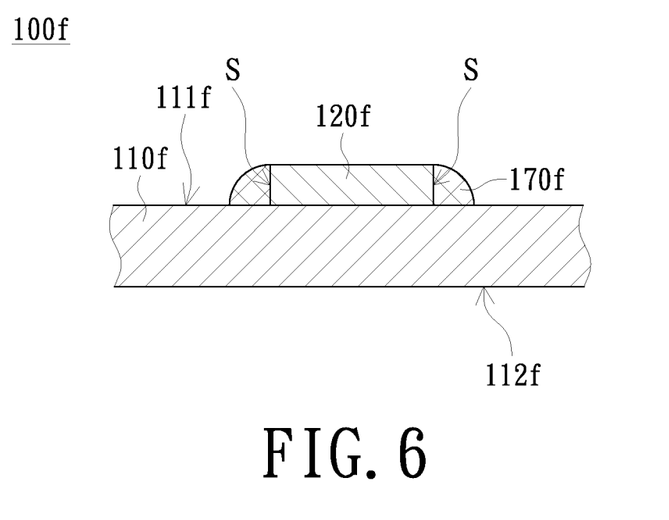
FIG. 6 is a schematic cross-sectional view of a wavelength conversion element according to another embodiment of the invention.

FIG. 6 is a partial schematic cross-sectional view of a wavelength conversion element according to another embodiment of the invention. The wavelength conversion element 100f of this embodiment and the above-mentioned wavelength conversion element 100a have similar structures and advantages, and only the differences will be described below. As shown in FIG. 6, the wavelength conversion element 100f further includes a welding part 170f. The welding part 170f is melted and connected between the counterweight member 120f and the first surface 111f of the substrate 110f. In other words, the wavelength conversion element 100f of this embodiment connects the counterweight member 120f and the substrate 110f with the welding part 170f after melting, wherein the counterweight member 120f and the substrate 110f are not melted during the welding process. In addition, FIG. 6 shows that the welding part 170f connects the side surface S of the counterweight member 120f and the first surface 111f of the substrate 110f; however, it is understood that the welding part 170f can also be sandwiched between the counterweight member 120f and the first surface 111f of the substrate 110f (opposite to the second surface 112f of the substrate 110f). In this embodiment, for example, the welding part 170f is solder and melted by arc welding, so that the melted welding part 170f is connected between the substrate 110f and the counterweight member 120f. The counterweight member 120f can be fixed on the substrate 110f after the welding part 170f is solidified.

Figure 7:
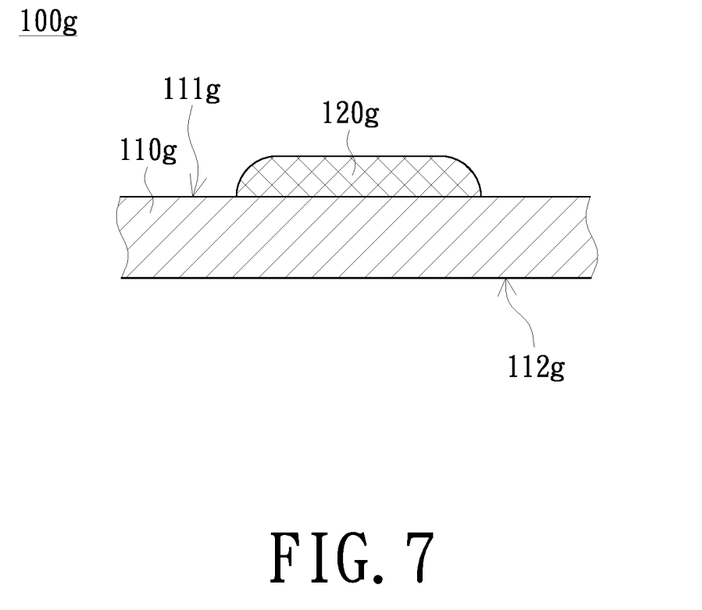
FIG. 7 is a schematic cross-sectional view of a wavelength conversion element according to another embodiment of the invention.

FIG. 7 is a partial schematic cross-sectional view of a wavelength conversion element according to another embodiment of the invention. Different from the foregoing embodiments, the counterweight member 120g is melted and connected to the first surface 111g of the substrate 110g (opposite to the second surface 112g of the substrate 110g) in the wavelength conversion element 100g of this embodiment. For example, the material of the counterweight member 120g may include solder, and the solder is disposed on the first surface 111g of the substrate 110g by a high-temperature melting method. The counterweight member 120g is formed after the molten solder is cooled and solidified. The above-mentioned high-temperature melting method is, for example, arc welding, but the invention is not limited thereto.

Figure 8:
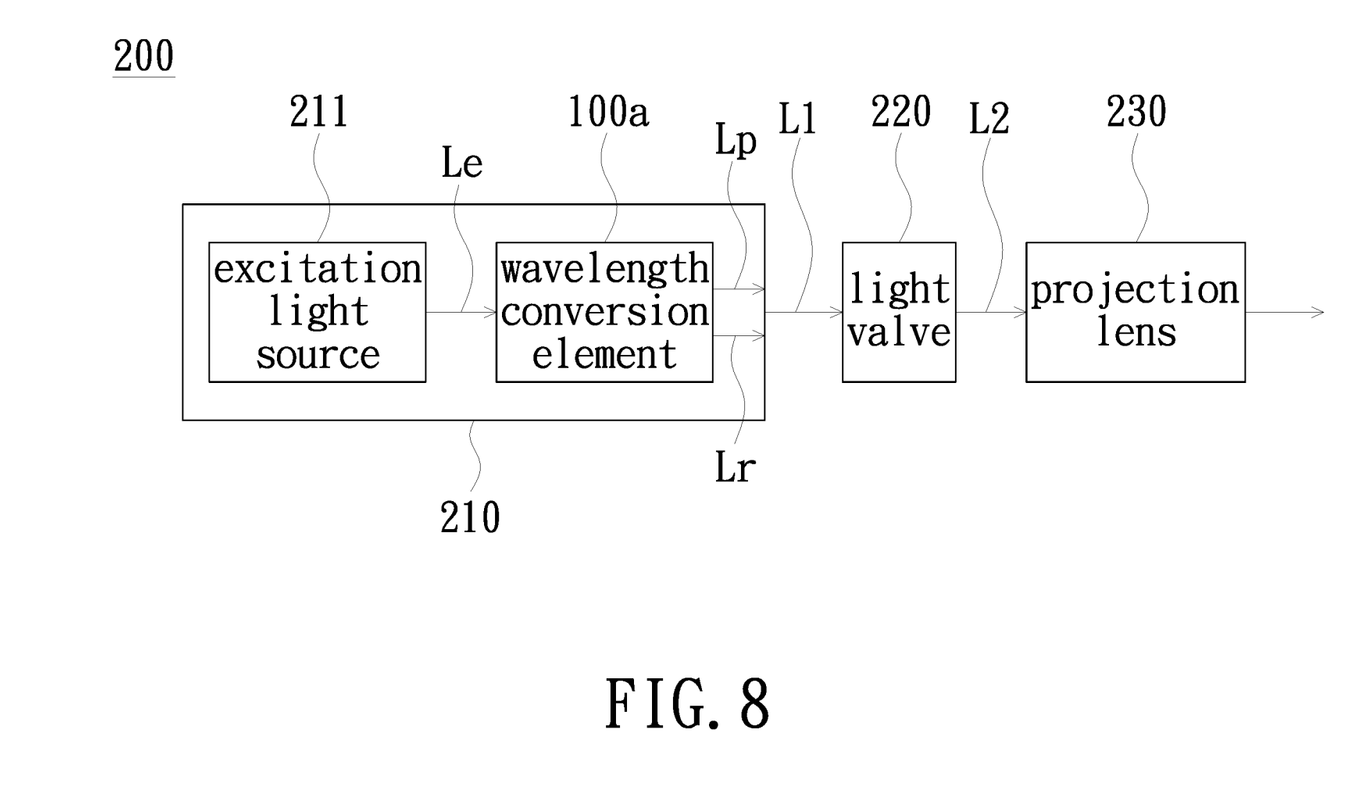
FIG. 8 is a block diagram of a projection device according to an embodiment of the invention.

FIG. 8 is a block diagram of a projection device according to an embodiment of the invention. Please refer to FIG. 8. The projection device 200 includes an illumination system 210, a light valve 220 and a projection lens 230. The illumination system 210 is adapted to provide an illumination beam L1. The light valve 220 is disposed on the transmission path of the illumination beam L1 to convert the illumination beam L1 into an image beam L2. The projection lens 230 is disposed on the transmission path of the image beam L2. The illumination system 210 includes an excitation light source 211 and a wavelength conversion element 100a. The excitation light source 211 is adapted to provide an excitation beam Le. The wavelength conversion element 100a is disposed on the transmission path of the excitation beam Le. Since the characteristics of the wavelength conversion element 100a have been described in detail in the foregoing, no redundant detail is to be given herein.

In some embodiments, the illumination system 210 includes an excitation light source 211 and a wavelength conversion element 100a. The excitation light source 211 includes, for example, a light emitting diode (LED) or a laser diode (LD), wherein the number of the light emitting diodes or laser diodes may be one or more. For example, the light emitting diodes (or laser diodes) can be arranged in a matrix when the number of light emitting diodes (or laser diodes) is plural, but the invention is not limited thereto. The wavelength conversion element 100a is disposed on the transmission path of the excitation beam Le to convert a part of the excitation beam Le into a converted beam Lp. In addition, the other part of the excitation beam Le is not converted into a converted beam by the wavelength conversion element 100a (indicated by the beam Lr in FIG. 8), and the beam Lr and the converted beam Lp form the illumination beam L1. In addition, the wavelength conversion layer 130 of the wavelength conversion element 100a receives the excitation beam Le from the excitation light source 211.

In some embodiments, the light valve 220 is, for example, a digital micromirror device (DMD), a liquid crystal on silicon (LCoS) or a liquid crystal display (LCD), but the invention not limited thereto. In addition, the invention does not limit the number of light valves. For example, the projection device 200 of this embodiment may adopt a structure of single-panel liquid crystal display panel or three-panel liquid crystal display panel, but the invention is not limited thereto.

In some embodiments, the projection lens 230 includes, for example, one or more optical lenses, and the diopter of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the foregoing non-planar lenses. On the other hand, the projection lens 230 may also include a flat optical lens. The invention does not limit the type and configuration of the projection lens 230.

In some embodiments, the projection device 200 has good reliability due to adopting the wavelength conversion element 100a. In addition, the wavelength conversion element 100a in the projection device 200 can also be replaced with the wavelength conversion elements 100b, 100c, 100d, 100e, 100f, or 100g of the other embodiments described above.

In summary, because the invention adopts the wavelength conversion element in which the counterweight member is welded to the substrate, it is not necessary to use the adhesive material with poor temperature resistance to fix the counterweight member, so that the wavelength conversion element of the invention has better reliability. On the other hand, the projection device of the invention can also have better reliability due to adopting the above-mentioned wavelength conversion element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface and the second surface are only used for distinguishing various elements and do not limit the number of the elements.

What is claimed is:

1. A wavelength conversion element, comprising a substrate, a counterweight member and a wavelength conversion layer, wherein:
    the substrate has a first surface and a second surface opposite to each other;
    the counterweight member is welded to the first surface of the substrate and protrudes from the first surface of the substrate; and
    the wavelength conversion layer is disposed on the first surface or the second surface of the substrate;
    the wavelength conversion element further comprising an auxiliary welding part located around the counterweight member and on the first surface of the substrate and is welded to the substrate and the counterweight member, wherein the auxiliary welding part, the substrate and the counterweight member are partially melted to form a welding structure, and the welding structure is located between the auxiliary welding part and the counterweight member and extends to the second surface of the substrate.

2. The wavelength conversion element according to claim 1, wherein the welding structure extends from a connection between the counterweight member and the substrate to a surface of the counterweight member away from the substrate.

3. The wavelength conversion element according to claim 2, wherein the welding structure protrudes from the surface of the counterweight member away from the substrate and/or the second surface of the substrate.

4. The wavelength conversion element according to claim 1, wherein the counterweight member is melted and connected to the first surface of the substrate.

5. The wavelength conversion element according to claim 1, further comprising a motor and a fixing member, wherein the substrate is sleeved on a rotating shaft of the motor, the fixing member is sleeved on the rotating shaft of the motor and pressed against the substrate, the wavelength conversion layer surrounds the rotating shaft of the motor, and the counterweight member is disposed between the fixing member and an outer edge of the substrate.

6. A projection device, comprising an illumination system, a light valve and a projection lens, the illumination system being adapted to provide an illumination beam, the light valve being disposed on a transmission path of the illumination beam to convert the illumination beam into an image beam, and the projection lens being disposed on a transmission path of the image beam, wherein the illumination system comprises:
    an excitation light source, adapted to provide an excitation beam; and
    a wavelength conversion element, disposed on a transmission path of the excitation beam, wherein the wavelength conversion element comprises a substrate, a counterweight member and a wavelength conversion layer, the substrate has a first surface and a second surface opposite to each other, the counterweight member is welded to the first surface of the substrate and protrudes from the first surface of the substrate, and the wavelength conversion layer is disposed on the first surface or the second surface of the substrate;
    wherein the wavelength conversion element further comprises an auxiliary welding part located around the counterweight member and on the first surface of the substrate and is welded to the substrate and the counterweight member, the auxiliary welding part, the substrate and the counterweight member are partially melted to form a welding structure, and the welding structure is located between the auxiliary welding part and the counterweight member and extends to the second surface of the substrate.

7. The projection device according to claim 6, wherein the welding structure extends from a connection between the counterweight member and the substrate to a surface of the counterweight member away from the substrate.

8. The projection device according to claim 7, wherein the welding structure protrudes from the surface of the counterweight member away from the substrate and/or the second surface of the substrate.

9. The projection device according to claim 6, wherein the counterweight member is melted and connected to the first surface of the substrate.

10. The projection device according to claim 6, wherein the wavelength conversion element further comprises a motor and a fixing member, the substrate is sleeved on a rotating shaft of the motor, the fixing member is sleeved on the rotating shaft of the motor and pressed against the substrate, the wavelength conversion layer surrounds the rotating shaft of the motor, and the counterweight member is disposed between the fixing member and an outer edge of the substrate.

\* \* \* \* \*